United States Patent
Sarbach

[15] 3,653,728
[45] Apr. 4, 1972

[54] BRAKE CONTROL SYSTEM UTILIZING FLUIDIC LOGIC ELEMENTS

[72] Inventor: Ronald A. Sarbach, Columbus, Ohio
[73] Assignee: Westinghouse Air Brake Company, Wilmerding, Pa.
[22] Filed: Apr. 28, 1970
[21] Appl. No.: 32,646

[52] U.S. Cl. ............................. 303/22 R, 188/195, 303/20
[51] Int. Cl. ........................................................ B60t 8/22
[58] Field of Search .................. 188/156, 195; 303/3, 20, 21, 303/22 R, 22 A

[56] References Cited

UNITED STATES PATENTS

| | | | |
|---|---|---|---|
| 3,398,815 | 8/1968 | Brath et al. | 303/22 X |
| 3,398,993 | 8/1968 | Sarbach et al. | 303/22 X |
| 3,443,842 | 5/1969 | Pier | 303/22 A X |
| 3,490,814 | 1/1970 | Smith et al. | 303/22 X |
| 3,547,499 | 12/1970 | Maskery | 303/22 X |

*Primary Examiner*—Milton Buchler
*Assistant Examiner*—Stephen G. Kunin
*Attorney*—Ralph W. McIntire, Jr.

[57] ABSTRACT

A pure fluid type brake control system for railway vehicles in which an input control signal representative of the desired brake effort is modified in accordance with the vehicle load for controlling the dynamic brakes. The difference between the load weighed brake control signal and a feedback signal corresponding to the variable effectiveness of the dynamic brake establishes an error signal for control of the friction brake which is regulated through a separate feedback loop to continuously blend with the dynamic brake and thereby satisfy the load weighed brake control signal. Provision is made to obtain full friction brake in response to a malfunction occurring in the digital application and release network comprising the friction brake control independently thereof.

8 Claims, 1 Drawing Figure

PATENTED APR 4 1972 3,653,728
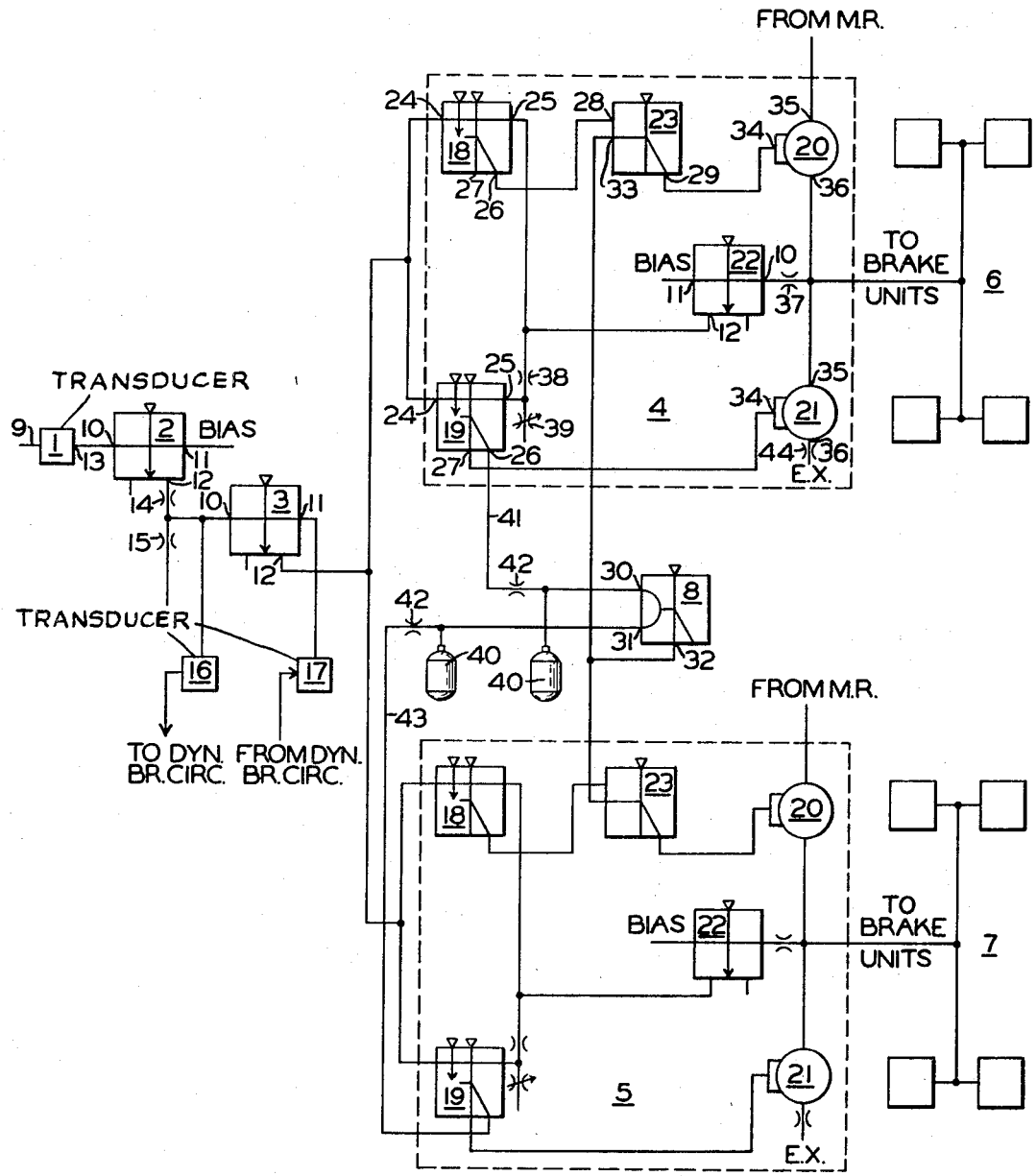
INVENTOR.
RONALD A. SARBACH
BY Ralph W. McIntire, Jr.
ATTORNEY

BRAKE CONTROL SYSTEM UTILIZING FLUIDIC LOGIC ELEMENTS

BACKGROUND OF THE INVENTION

Improved high speed rapid transit railway systems are becoming increasingly important in today's highly mobilized society for transporting large masses of the populace between inter-urban points and along densely populated corridors between cities. The ability to achieve high speed transit service is dependent to a large extent upon the vehicle braking system, especially where the adequacy of the service requires that minimum train headways and tight operating schedules are maintained without discomfort to passengers. Electronic brake control systems, which offer fast response and continuous automatic regulation of the retardation effort, together with other brake system developments, have been responsible in upgrading the brake system technology to meet existing high speed mass transit requirements.

Being fragile by nature, sensitive to environmental conditions such as electrical interference and extreme temperature variations, complex by necessity of design and requiring a sophisticated power supply, it is apparent, however, that these electronic brake control systems are expensive both in initial cost and to maintain, especially under such adverse conditions as are known to exist in railroad operations as we know them today.

Conversely, the recently evolved pure fluid technology known as "fluidics" employs fast responding components which have no moving parts to wear and therefor exhibit a long, service free operating life, which are reliable under extreme temperature variations, and are substantially insensitive to stray electrical fields, in addition to utilizing the pneumatic medium as a source of power which is readily available in the air supply system on rapid transit type railway cars.

SUMMARY OF THE INVENTION

It is therefore the principle object of the present invention to provide a brake control system having sensitive and near instantaneous response for automatically regulating the brake effort of a railway vehicle including the functions of variation of braking level with vehicle load and continuous dynamic/friction brake blending.

It is another object of the invention to provide a vehicle brake control system having a failsafe arrangement in which a redundant circuit check is provided to monitor the release elements of the friction brake control network so that in the event a malfunction arises therein, application of the friction brake will occur independently of the normal friction brake control.

It is yet another object of the invention to provide a vehicle brake control system, as outlined above, comprised of pure fluid control elements.

In the present invention, these objects are achieved by feeding an analog fluid pressure control signal in the fluidic range of pressure levels from an appropriate transducer to a proportional type pure fluid amplifier. The transducer is selected in accordance with the medium of the control system input signal employed and converts this analog input signal to a proportional fluidic signal representing the desired retardation effort. The output of the proportional amplifier reflects this desired retardation signal which is subsequently modified in response to variation of vehicle load through automatic adjustment of an orifice connecting the amplifier output to atmosphere. Dynamic brake control responsive to the load weighed control signal is compared by a second pure fluid proportional amplifier with a feedback signal corresponding to the effectiveness of the dynamic brake which is typically slow in responding and which fades as the vehicle slows. The resulting difference between signal levels establishes an error signal at the amplifier output representing the amount of friction brake necessary to satisfy the degree of brake retardation requested.

Each truck of a rapid transit vehicle is provided with digital application and release control circuits subject to the error signal for controlling the friction brakes. A pair of pure fluid Schmitt Trigger control circuits in the respective application and release networks respond to variation in the error signal to produce output signals for controlling two-way, low to high pressure pneumatic relay valves so that when the Schmitt Trigger in the application circuit responds to the error signal, a supply of high fluid pressure is connected via one relay valve to the brake units and when the Schmitt Trigger in the release circuit responds, the brake application pressure is exhausted via the other relay valve. A signal corresponding to the fluid pressure effective at the brake units acts on a third pure fluid proportional amplifier, the output of which is connected as a feedback signal to the application and release Schmitt Triggers to provide system regulation. Opposing the error signal at the Schmitt Triggers, the feedback signal will disable the appropriate application or release circuit which initiated the supply or exhaust of brake pressure, as the case may be, and consequently produce a lap condition of the friction brake.

A redundant circuit arrangement including a NAND gate common and responsive to corresponding signals from the pure fluid release circuits associated with each truck of the vehicle monitors the relative condition of the respective truck release circuits, causing application of the friction brake if the control signals fail to agree after a predetermined delay due to one of the release circuits malfunctioning. An OR gate interposed in the application network of each truck between the relay valve and Schmitt Trigger to which one of its control ports is connected is subject at its other control port to the output of the NAND gate to override the normal brake control of the application Schmitt Trigger when a malfunction occurs.

Other objects, features and attendant advantages of the present invention will be apparent from the following more detailed description and operation when considered with the accompanying diagrammatic drawing illustrating the invention.

DESCRIPTION AND OPERATION

Referring now to the drawing, the system basically includes an input transducer 1; pure fluid proportional type amplifiers 2 and 3 for establishing a load weighed, dynamic brake modified, friction brake control signal; redundant digital friction brake control circuitry 4 and 5 associated with the railway trucks supporting opposite ends of a railway vehicle; fluid pressure operated brake means such as typical friction brake units indicated by blocks 6 and 7 responsive to the control circuits 4 and 5 and normally mounted on the vehicle truck for applying a friction brake force in the area of the wheels thereof; and an AND/NAND gate 8 common to circuits 4 and 5 for providing failsafe operation of circuits 4 and 5.

Transducer 1 is selected in accordance with the nature of the system input signal effective at a control port 9 to convert the input signal into a proportional pneumatic fluidic pressure signal.

Proportional amplifiers 2 and 3 each include a supply port to which a source of fluidic pressure is connected, a pair of opposing control ports 10 and 11, and a connected output 12. Control port 10 of amplifier 2 is connected to output 13 of transducer 1 while opposing control port 11 is supplied with a bias signal which is adjusted and maintained at a level sufficient to drive the amplifier power stream away from output 12 when the signal at control input 10 is absent so that no output signal is provided. Output 12 of amplifier 2 is connected to atmosphere by way of a pair of series connected fluid pressure flow restrictors 14 and 15 which form a pressure divider. The orifice of restrictor 15 is varied with vehicled load by means (not shown) to control the pressure level between the restrictors depending upon the magnitude of the signal at output 12. Thus, as the brake control signal at the input transducer 1 is varied, its output signal, which is converted by the transducer to the proper pneumatic medium, is utilized to control amplifier 2, the output of which is varied accordingly and thence modified to reflect the changing load conditions of the vehicle in consequence of adjustment of the variable orifice of restrictor 15.

Connected to the input of a pneumatic (fluidic) to electric transducer 16 having an output adapted to regulate the dynamic brake control circuitry (not shown) and to input port 10 of amplifier 3 is the load adjusted fluid pressure brake control signal effective between series restrictors 14 and 15. The opposite control input 11 of amplifier 3 is connected with the output of an electric to pneumatic (fluidic) transducer 17 responsive to the dynamic brake control circuits for monitoring the effectiveness of the dynamic brake. The pressure differential across control ports 10 and 11 of amplifier 3 therefore is representative of the difference between the brake request and the degree of dynamic brake being provided. In accordance with conventional pure fluid type proportional amplifier operation, a proportional fluid pressure error signal representative of this difference is produced at output 12 of amplifier 3 for establishing the degree of friction brake control necessary to satisfy the brake request signal at input 9 of transducer 1. It will be apparent that as the dynamic brake feedback signal effective at input 11 of amplifier 3 becomes progressively less in accordance with the fade characteristic of the dynamic brake as the vehicle approaches a stop, the error signal at output 12 becomes proportionally greater to provide the degree of friction brake necessary to maintain a level of brake effort consistent with the brake request signal through continuous blending of the separate dynamic and friction brake control systems. Conversely, as the error signal (hereinafter referred to as the friction brake control signal) between the desired and actual brake effort realized from the dynamic brake decreases, due to the dynamic brake providing a greater share of the braking, the friction brake demand required to satisfy the brake request becomes proportionally less. If the dynamic brake is able to provide the total brake request, there will be no pressure signal at output 12 of amplifier 3 and the friction brakes will be withheld.

Friction brake control circuits 4 and 5 are identical in both structure and function for installation on the separate trucks supporting opposite ends of a railway vehicle and will therefore be described with reference only to circuit 4, it being understood that the description also applies to circuit 5.

Brake control circuit 4 is comprised of application and release control networks, which include a pure fluid Schmitt Trigger circuit 18 and 19 as the input elements responsive to the friction brake control signal for controlling the application and release control network components and low to high pressure digital relay valve device 20 and 21 respectively. A pure fluid proportional amplifier 22 is utilized as the feedback element for producing a signal at Schmitt Triggers 18 and 19 representative of the friction brake force developed. Also provided in the application network is a pure fluid OR gate 23 interposed between the Schmitt Trigger 18 and relay valve 20. The low to high pressure relay valve devices 20 and 21 may be one of several commercially available types suitable for the intended application of producing a high pressure output in response to a low or fluidic control signal. For purposes of simplifying the discussion, the low to high pressure relay valve devices 20 and 21 may be considered as providing a two-way low to high pressure conversion function; i.e., the valve either establishes or interrupts fluid pressure communication between its supply and delivery ports in accordance with the presence or absence of a low pressure (fluidic) control signal.

The identical pure fluid Schmitt Trigger circuits 18 and 19 are illustrated diagramatically but in actual practice may be fabricated from an input flip-flop device connected through three stages of cascaded proportional amplifiers to an output OR/NOR gate. The representative symbology illustrates this circuit which includes a pair of supply ports to which separate sources of fluidic supply pressure are connected, a pair of opposing control ports 24 and 25, and outputs 26 and 27. Being, in reality, a highly sophisticated flip-flop or bistable device capable of being easily switched at prescribed pressure levels due to its high sensitivity, pressurization of control port 24 at a predetermined minimum pressure level above the pressure level at opposing input 25 will result in the Schmitt Trigger circuit "switching on" to pressurize output 26, which will remain pressurized by inherent memory of the device until the control port 25 subsequently becomes pressurized at some value above pressurization of port 24 to consequently "switch off" the device, in which state output 26 becomes depressurized until the differential across the control ports is again reversed The friction brake control signal from output 12 of amplifier 3 representing the required friction brake is connected to control port 24 of Schmitt Trigger 18 associated with the application network and also to control port 24 of Schmitt Trigger 19 associated with the release network of brake control circuit 4. Assuming the absence of a control signal at opposing control ports 25 of the respective Schmitt Triggers 18 and 19, as will be the case when the brakes are in a fully released condition, control pressure at inputs 24 will be effective to cause pressurization of outputs 26 of each Schmitt Trigger.

Output 26 of application Schmitt Trigger 18 is connected to a control port 28 of OR gate 23 so that when pressurized, the power stream of OR gate 23 is deflected so as to pressurize its OR output 29. Outputs 26 of release Schmitt Triggers 19 associated with brake control circuits 4 and 5 are connected to control ports 30 and 31 respectively of AND/NAND gate 8. Concurrent pressurization of control ports 30 and 31 causes AND/NAND gate 8 to depressurize its NAND output 32 connected to a control port 33 of OR gate 23. This is the normal condition of the circuits with the absence of a control signal at input 33 of OR gate 23 allowing full control of OR gate 23 by application Schmitt Triggers 18 for control of the brakes.

Pressurization of OR gate control port 28 by Schmitt Trigger output 26 as just described results in its supply stream being switched into OR output 29 connected to the control port 34 of digital relay valve 20 used as a supply valve. This results in valve 20 being enabled to establish fluid pressure communication between a regulated high pressure source of supply effective at input port 35 and the brake units 6 connected to output port 36. As long as control port 34 remains pressurized to pilot supply valve 20, fluid pressure will build up at the brake units and friction brake forces will develop accordingly, the forces developed being dependent therefore upon the duration Schmitt Trigger 18 continues to enable OR gate 23. It will be noted that during this period of brake application, control port 34 of relay valve 21, which is identical to valve 20 and is used as an exhaust valve in the release network, is depressurized due to its being connected to vented output 27 of Schmitt Trigger 19 in the release network. Consequently, its input port 35, which is connected to the brake units 6 is cut off from output port 36 which is connected to atmosphere. Thus, pressure delivered to the brake units 6 by supply valve 20 is prevented from exhausting to atmosphere during periods of brake application.

Subject to the buildup of fluid pressure at the brake units via a choke 37, which reduces the high pressure to a proportional analog signal at fluidic levels, is control port 10 of proportional amplifier 22 which is identical with previously described amplifiers 2 and 3 and is identified with corresponding reference numerals. A bias signal is provided at control port 11 in opposition to the signal effective at port 10 sufficient to maintain substantially zero pressure at output 12 when brake application pressure is reduced below a value of any consequence. As brake application pressure develops, the corresponding signal increase at port 10 overcomes the bias and results in an increased pressure differential across the control ports and a proportional rise in pressure at output 12. This feedback signal at output 12 of an amplifier 22 representing the effective friction brake force is connected in parallel to control inputs 25 of Schmitt Triggers 18 and 19 in the respective application and release networks.

When the feedback signal at input 25 of Schmitt Trigger 18 rises slightly above the effective friction brake control signal at input 24, indicating that the friction brake call has been satisfied, the Schmitt Trigger 18 will "turn off;" i.e., the signal at output 26 will dissipate due to the Schmitt Trigger switching to its opposite digital state. OR gate 23 is consequently disabled by the resultant absence of a signal at control port 28, causing the signal at control port 34 of valve 20 to dissipate. Loss of pressure at port 34 results in fluid pressure communication being interrupted between input 35 and output 36 to terminate the brake application at a value corresponding to the friction brake control signal which is the difference between the load weighed brake control signal and that portion of the brake request fulfilled by the dynamic brake.

In order to prevent the feedback signal from exceeding the brake control signal at input 24 of Schmitt Trigger 19 in the release network, so as not to inadvertently change its digital state, a choke 38 is placed in the line connecting output 12 of amplifier 22 to input 25 of release Schmitt Trigger 19. In series with and downstream of choke 38 is a variable bleed choke 39 for adjusting the feedback signal at port 25 so as to establish the signal level a predetermined amount below the friction brake control signal level at port 24. Within a range proportional to this pressure differential, the brake application pressure is able to overshoot the desired pressure without the feedback signal at port 25 exceeding the control signal at port 24. This permits the application network to be positively disabled without inadvertently triggering the Schmitt Trigger 19 and assures that the system will not cycle.

Since the state of the release Schmitt Trigger 19 remains stable, it will be apparent that valve 21 also remains in its normal condition in which the brake application pressure is cut off from atmosphere. Consequently, a lap condition of the friction brakes is achieved wherein the level of brake application pressure is maintained at a value corresponding to the friction brake control signal. Any subsequent imbalance or change in this steady state condition due, for example, to a rise or drop in the brake control signal or the brake application pressure will result in the control circuit responding, as the changing conditions dictate, to achieve and maintain the desired brake application pressure, i.e., to supply or exhaust brake pressure. It will be apparent therefore that this lap condition is the normal condition of the circuit.

With the application and release networks of the brake control circuits in a lap condition, any change in the friction brake control signal will result in the control circuit responding to vary the brake pressure accordingly. For example, a further increase in the brake control signal will again activate the application network through operation of Schmitt Trigger 18, causing a further increase in brake application pressure as previously explained without changing the state of the release network. When the feedback signal level corresponding to the buildup of brake pressure is sufficient to overcome the control signal across Schmitt Trigger 18, the application network will again become disabled to effect a lap condition of the brakes.

On the other hand, a reduction in the friction brake control signal which is effective at control inputs 24 of Schmitt Triggers 18 and 19 associated with the respective application and release networks results in the release network being enabled through Schmitt Trigger 19 to exhaust brake pressure. Due to the signal at input 24 of Schmitt Trigger 19 being reduced below the feedback signal at input 25, Schmitt Trigger 19 is consequently switched to its opposite digital state in which output 26 is depressurized and output 27 is pressurized. From output 27, control port 34 of relay valve 21 is pressurized to pilot the relay and consequently connect brake pressure to atmosphere via its input port 35 and output port 36 until the brake pressure corresponds to the brake control signal. Input 10 of amplifier 22 senses the brake pressure effective at brake units 6 so that as the brake pressure reduction occurs, the amplifier output 12 develops a proportional analog signal. Being effective at control inputs 25 of the Schmitt Triggers 18 and 19, the reduction of brake pressure will continue only until the feedback signal at input 25 of Schmitt Trigger 19 drops below the brake control signal at input 24, causing the Schmitt Trigger 19 to switch states. Relay valve 21 is accordingly disabled to terminate the flow of brake pressure to atmosphere.

During this cycle of events, the application network remains disabled due to the reduction in the brake control signal at input 24 of Schmitt Trigger 18 simply reinforcing the disabled condition of the Schmitt Trigger. Due to the series chokes 38 and 39, reducing the feedback signal at port 25, it will be apparent that the Schmitt Trigger 19 is able to anticipate the control signal at port 24 being satisfied. The reduced feedback signal as the reduction in brake pressure approaches the pressure called for by the brake control signal consequently causes Schmitt Trigger 19 to terminate the reduction in brake pressure before the reducing feedback signal is able to allow Schmitt Trigger 18 to "Switch on." Any "hunting" due to overshooting of the brake pressure, which would otherwise cause the system to cycle, is thus avoided by the anticipatory action of Schmitt Trigger 19.

During normal operation, as above described, control signals are provided at control ports 30 and 31 to maintain NAND output 32 of AND/NAND gate 8 depressurized, consequently withholding a pressure state control signal from input 33 of OR gate 23 which is thereby conditioned to control supply valve 20 in response to control signals at input 28 provided by Schmitt Trigger 18 which, together with release Schmitt Trigger 19, is subject to feedback control by amplifier 22 for regulating the system brake pressure in a closed loop mode. In brake application as well as lap conditions, outputs 26 of release Schmitt Triggers 19 in brake control circuits 4 and 5 are pressurized to establish control signal pressure at control ports 30 and 31 of AND/NAND gate 8, thereby depressurizing output 32. In brake release condition, outputs 26 of release Schmitt Triggers 19 are depressurized. However, a volume reservoir 40 in line 41 connecting the release Schmitt Trigger output 26, associated with circuit 4, to input 30 of AND/NAND gate 8 provides a head of pressure to maintain control port 30 pressurized for a predetermined duration. A choke 42 prevents the driving pressure provided by reservoir 40 from venting back through Schmitt Trigger 19. Similarly, a reservoir 40 and choke 41 provided in line 43 connecting the release Schmitt Trigger output 26, associated with circuit 5, with AND/NAND gate control port 31 maintain control port 31 pressurized. It will thus be apparent that the size of volume reservoirs 40 is selected to provide driving pressure control signals at AND/NAND gate 8 for sufficient duration until the normal circuit operation returns release Schmitt Triggers 19 to their normal state as established in lap condition of the circuit, in which state outputs 26 charge reservoirs 40 to maintain AND/NAND gate 8 disabled, thus preventing false failsafe operation as long as the Schmitt Triggers return to their normal state within a predetermined period to give evidence of their integrity of operation.

In the event an unsafe operating condition arises due, for example, to one or the other, or both of the Schmitt Triggers 19 associated with brake control circuits 4 and 5 being stuck in a release condition, in which outputs 26 are depressurized for such duration that the delay period provided by reservoirs 40 expires, as evidenced by loss of pressure signals at either one or both of AND/NAND gate inputs 30 and 31, NAND output 32 thereof will become pressurized. Consequently, a control signal is presented at input 33 of each OR gate 23, resulting in their outputs 29 being pressurized to actuate supply valves 20, which connect supply pressure to brake units 6 at each truck. OR gates 23, being enabled by pressure supplied to control port 33, will maintain valves 20 in an actuated state, allowing maximum supply pressure to develop irrespective of continued control through the application Schmitt Triggers 18.

The fact that one or both release Schmitt Triggers malfunction by sticking in a release state in which outputs 26 are pressurized indicates that the corresponding release or exhaust valve 21 is actuated, connecting brake pressure to atmosphere. A choke 44 at port 36 of valve 21 limits this rate of exhaust so that full supply pressure, which is traditionally maintained at a value 50 percent higher than the expected maximum brake pressure, should be sufficient to develop brake pressure to a value between 50 percent and 75 percent of normal maximum brake pressure at the truck circuit having the malfunction. Since the redundant brake circuits would not likely malfunction at the same time, brake pressure at the truck opposite the one having a malfunction would be expected to develop full brake pressure in response to the malfunction signal so that the total brake effort provided under such unsafe operating conditions would be considered adequate to bring the vehicle to a safe stop.

I claim:
1. A vehicle brake control system including:
   a. means providing a first signal representing a desired degree of brake effort,
   b. means responsive to vehicle lead for modifying said first signal to produce a primary brake signal,
   c. means for generating a second signal representative of the degree of dynamic brake effective in response to said primary brake control signal,
   d. comparison means providing a secondary brake control signal in accordance with the difference between said primary brake control signal and said second signal, and
   e. brake application and release control means responsive to said secondary brake control signal, comprising:
      i. supply valve means for controlling fluid pressure communication between friction brake and a source of fluid pressure,
      ii. exhaust valve means for controlling fluid pressure communication between friction brake and atmosphere,
      iii. means responsive to the degree of application of a friction brake for providing a feedback signal proportionate thereto,
      iv. first pure fluid digital amplifier means having opposing control ports subject to said secondary brake control signal and said feedback signal for producing an output signal when a difference therebetween exists in one sense to pilot said supply valve means and thereby tend to reduce the difference between said secondary brake control signal and said feedback signals, and
      v. second pure fluid digital amplifier means having a first and a second output and opposing control ports subject to said secondary brake control signal and said feedback signal, the difference therebetween producing a signal at said first output when in said one sense and at said second output when in a sense opposite said one sense to pilot said exhaust valve and thereby tend to reduce the difference between said secondary brake control and said feedback signals.

2. A vehicle brake control system as recited in claim 1 wherein said brake application and release control means further comprises pure fluid OR gate means having one input subject to the output signal of said first pure fluid digital amplifier for producing an output signal when the difference between said secondary brake control signal and said feedback signal is in said one sense to pilot said supply valve means.

3. A vehicle brake control system as recited in claim 2 wherein said vehicle includes a plurality of trucks each having associated therewith said brake application and release control means, said system being further characterized by failsafe control means comprising pure fluid AND gate means having a pair of inputs, each input being connected to the first output of said second pure fluid digital amplifier means associated with a different one of said trucks and a NAND output producing a signal for connection with a second input of said OR gate when one or both inputs of said AND gate are absent.

4. A vehicle brake control system as recited in claim 3 wherein said failsafe control means further comprises signal delay means associated with each input of said AND gate for maintaining a signal thereat for a predetermined duration when said first output of the respective one of said second pure fluid digital amplifiers associated with said duplicate application and release control means is depressurized subsequent to pressurization of said second output.

5. A brake control system as recited in claim 1 further comprising fluid pressure flow restriction means for modifying said feedback signal at said second pure fluid digital amplifier relative to said feedback signal provided at said first pure fluid digital amplifier to establish a differential set point at which said first and second pure fluid digital amplifiers change state.

6. A vehicle brake control system comprising:
   a. pure fluid proportional amplifier means for providing a first signal representing a desired degree of brake effort,
   b. fluid flow restriction means varied in accordance with vehicle load for providing a primary brake control signal,
   c. means for generating a second signal representative of the degree of dynamic brake effective,
   d. pure fluid proportional amplifier means for providing a secondary brake control signal in accordance with the difference between said primary brake control signal and said second signal, and
   e. pure fluid brake control means for control of friction brakes in accordance with said secondary brake control signal.

7. A vehicle brake control system comprising:
   a. means for providing a first signal representing a desired degree of brake effort on said vehicle,
   b. means for generating a second signal representing the degree of dynamic brake effective in response to said first signal,
   c. comparison means for providing a friction brake signal in accordance with the difference between said first and second signals, and
   d. friction brake control means comprising:
      i. supply valve means for controlling fluid pressure communication between a friction brake and a source of fluid pressure,
      ii. exhaust valve means for controlling fluid pressure communication between said friction brake and atmosphere,
      iii. a pure fluid proportional amplifier having an output pressurized in accordance with the degree of pressurization of said friction brake to provide a feedback signal, and
      iv. application and release control means responsive to the difference between said friction brake signal and said feedback signal for controlling said supply and exhaust valve means to thereby control the degree of friction brake application.

8. A vehicle brake control system, as recited in claim 7, wherein said friction brake control means further comprises failsafe control means for controlling fluid pressure communication between said source and said friction brake in bypass of aid application and release control means when a malfunction of said friction brake control means occurs.

* * * * *